(No Model.) 13 Sheets—Sheet 1.
R. L. HOWARD.
MACHINERY FOR SECURING CORKS OR STOPPERS IN BOTTLES.
No. 342,015. Patented May 18, 1886.

FIG. 1.

Witnesses
Chas. H. Smith
J. Staib

Inventor
R. L. Howard
per Lemuel W. Serrell
atty (No Model.) 13 Sheets—Sheet 2.

R. L. HOWARD.
MACHINERY FOR SECURING CORKS OR STOPPERS IN BOTTLES.

No. 342,015. Patented May 18, 1886.

Witnesses
Chas H Smith
J Stait

Inventor
R. L. Howard
per Lemuel W. Serrell
atty

N. PETERS, Photo-Lithographer, Washington, D. C.

(No Model.)   13 Sheets—Sheet 4.

R. L. HOWARD.
MACHINERY FOR SECURING CORKS OR STOPPERS IN BOTTLES.

No. 342,015.   Patented May 18, 1886.

FIG. 5.

Witnesses   Inventor (No Model.) 13 Sheets—Sheet 6.
R. L. HOWARD.
MACHINERY FOR SECURING CORKS OR STOPPERS IN BOTTLES.
No. 342,015. Patented May 18, 1886.

Witnesses
Chas H Smith
J. Stark

Inventor
R. L. Howard
per Lemuel W. Serrell
atty (No Model.)  
13 Sheets—Sheet 9.

R. L. HOWARD.
MACHINERY FOR SECURING CORKS OR STOPPERS IN BOTTLES.

No. 342,015.  Patented May 18, 1886.

Witnesses  
Chas H Smith  
J. Stait

Inventor  
R. L. Howard  
per Lemuel W. Serrell Atty (No Model.) 13 Sheets—Sheet 10.

R. L. HOWARD.
MACHINERY FOR SECURING CORKS OR STOPPERS IN BOTTLES.

No. 342,015. Patented May 18, 1886.

Witnesses
Chas H Smith
J. Staily

Inventor
R. L. Howard
per Lemuel W. Serrell
atty (No Model.) 13 Sheets—Sheet 11.

R. L. HOWARD.
MACHINERY FOR SECURING CORKS OR STOPPERS IN BOTTLES.

No. 342,015. Patented May 18, 1886.

Witnesses
Chas. H. Smith
J. Stail

Inventor
R. L. Howard
per Lemuel W. Serrell
atty (No Model.) 13 Sheets—Sheet 12.

R. L. HOWARD.
MACHINERY FOR SECURING CORKS OR STOPPERS IN BOTTLES.

No. 342,015. Patented May 18, 1886.

Witnesses
Chr. H. Smith
J. Staib

Inventor
R. L. Howard
per Lemuel W. Serrell atty

N. PETERS, Photo-Lithographer, Washington, D. C.

UNITED STATES PATENT OFFICE.

ROBERT LUKE HOWARD, OF LUTON, COUNTY OF BEDFORD, ENGLAND.

MACHINERY FOR SECURING CORKS OR STOPPERS IN BOTTLES.

SPECIFICATION forming part of Letters Patent No. 342,015, dated May 18, 1886.

Application filed October 12, 1883. Serial No. 108,786. (No model.) Patented in England January 19, 1883, No. 324, and in France July 18, 1883, No. 156,613.

*To all whom it may concern:*

Be it known that I, ROBERT LUKE HOWARD, a subject of the Queen of Great Britain, residing at Luton, in the county of Bedford, England, have invented certain new and useful Improvements in Machinery for Securing Corks or Stoppers in Bottles, (for which I have received Letters Patent in Great Britain, dated January 19, 1883, No. 324, and in France, dated July 18, 1883, No. 156,613;) and I do hereby declare the following to be a full, clear, and exact description of the invention, such as will enable others skilled in the art to which it appertains to make and use the same.

This invention consists in machinery for securing corks or stoppers in bottles by wiring. I provide a reciprocating bottle-stand for supporting the bottle, and upon which it is raised and lowered. There are reels carrying wires and guides for the wires to pass through. Reciprocating pinchers convey the wires with one end twisted from the guides, two of said wires passing across the top of the cork and one at each side of the bottle-neck. I provide a twister for twisting the wires to secure them across the top of the cork or stopper and around the projecting ring of the neck of the bottle, and shears for cutting the twisted wires, and I provide suitable mechanism for operating these various devices either by hand or steam power.

In the drawings, Fig. 4, a plan section on line B B of Fig. 3, and Fig. 5 a side elevation of the first-named machine, and Fig. 6 a series of diagrams illustrating the paths and functions of the cams which perform the various automatic actions of the machine. Fig. 7 shows the neck of a bottle as wired. Figs. 11 and 12 are detail views of parts of said machine. Fig. 16 is a partial end view, Fig. 17 a partial side view, and Fig. 18 a sectional plan, of a special form of my wiring-machine; and Fig. 19 is a view of the finished loop of wire as made by this attachment.

F is the bed-plate, and G a hollow pillar-frame fixed thereon. Motion is, by means of a strap, transmitted from a shaft or motor to the horizontal shaft H, which partly enters the lower part of the pillar-frame G, and is provided with a worm, H', which gears with a worm-wheel, I, on an upright shaft, I'. This latter works in a step-brass, $I^2$, in the bed-plate F and in a socket formed in the cap G' on the top of the pillar-frame G. The cap G' is provided with a brass, $G^2$, which can be adjusted against the top of the shaft I' by means of a set-screw.

On the shaft I' several cams are fixed, which, by suitable connections, serve to perform the various required functions of the machine. The cam A is provided with a cam-groove and serves to twist the wires. The cam B has an upper and a lower cam-surface, and serves to cut the wire when twisted. The cams C and D, which are formed on the top and bottom of the same rim-casting, serve to operate the pliers, which at certain intervals advance, grip the end of the twisted wire where it has been severed by the previous cutting operation, pull it across the top of the bottle, and then release it. The cam E has an upper and lower cam-surface, and serves to raise the bottle and to depress the wired bottle and to kick it off its rest and discharge it out of the machine.

A complete set or series of the aforesaid operations is performed twice in every revolution of the vertical shaft I'.

Figure 6:
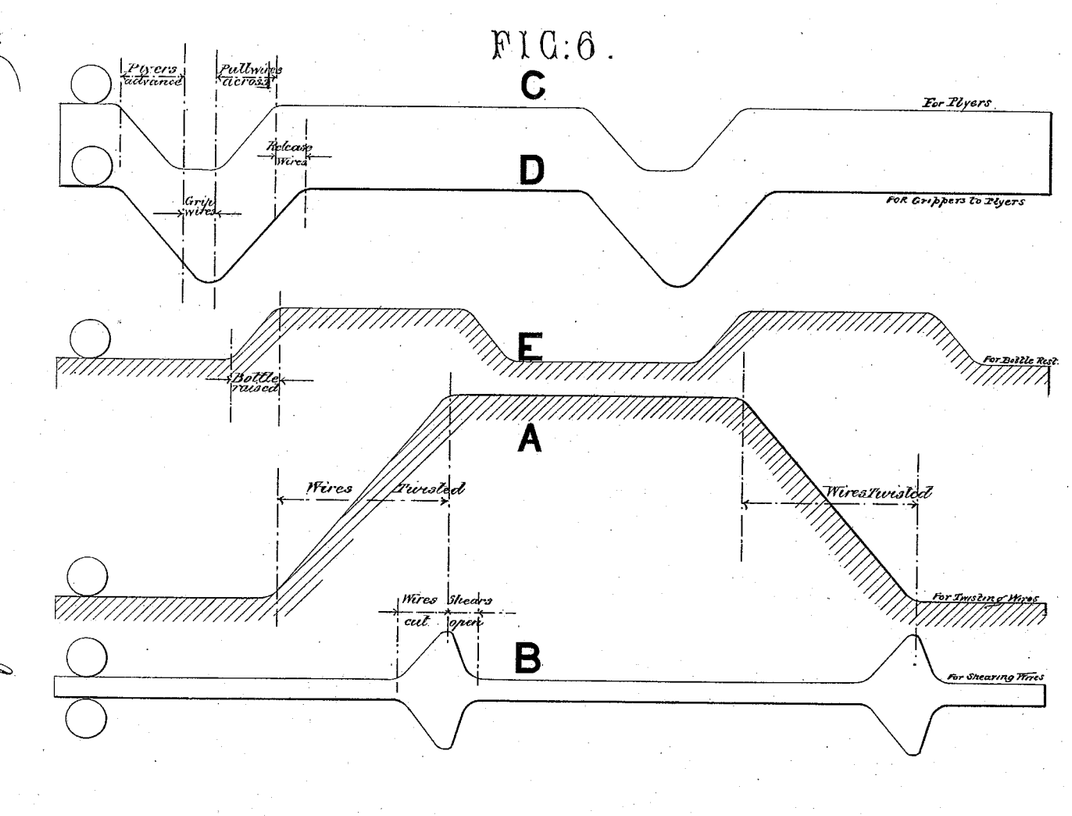

The diagrams, Fig. 6, illustrate the paths or forms of the cams, and also indicate their functions.

The various cam-connections and parts operated thereby or in connection therewith are as follows: The grooved cam A operates a bowl, $a'$, which is mounted on a rack, $a^2$, that is guided between the guides $a^3$ on the pillar-frame G. The rack $a^2$ gears with the pinion $a^4$, which is fixed on a shaft, $a^5$, working in bearings on the outside of the pillar-frame G.

Figure 4:
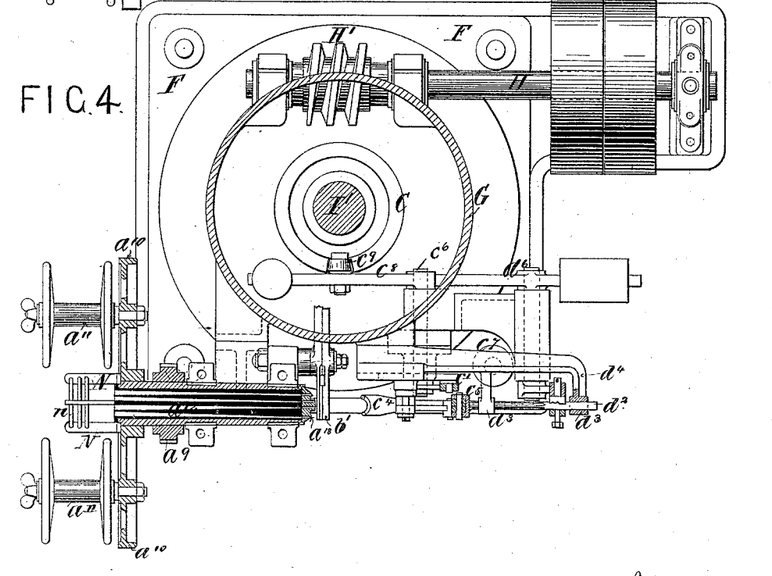
Figure 5:
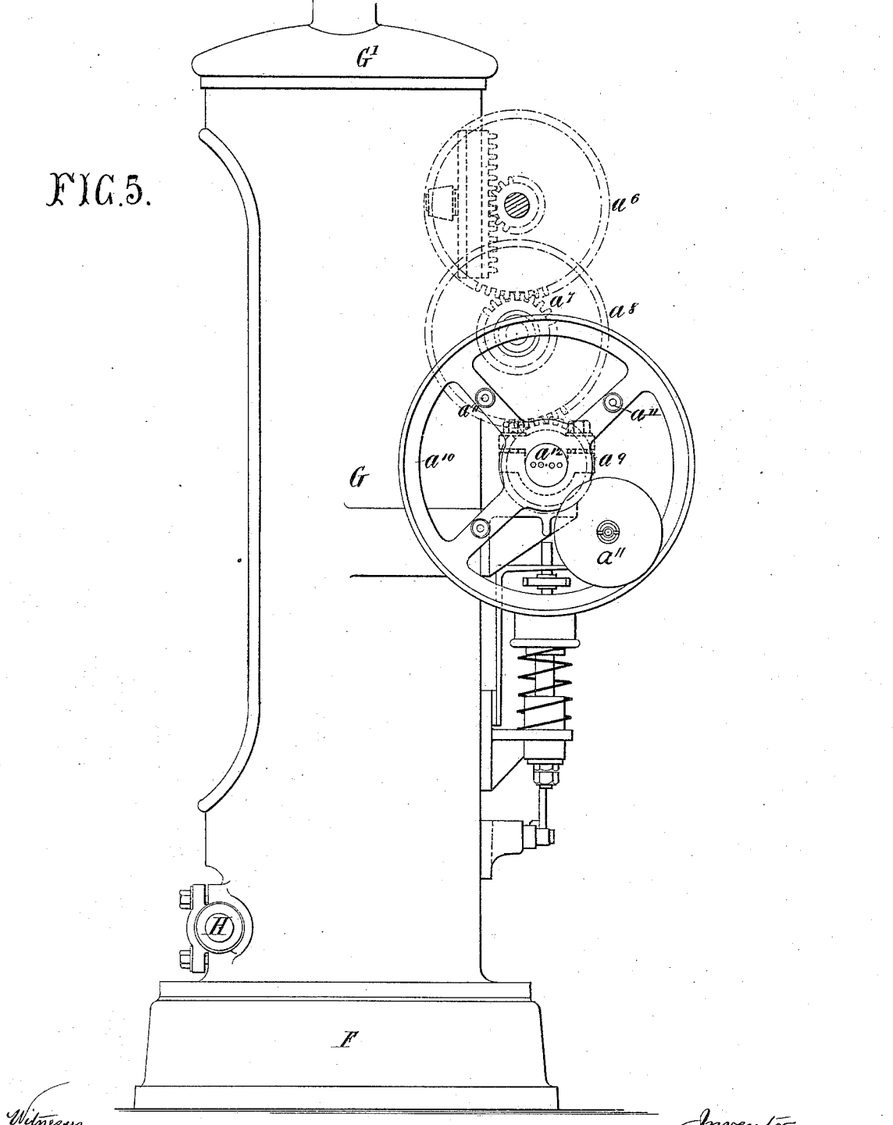

On the shaft $a^5$ is also fixed a toothed wheel, $a^6$, which, by tooth-gears $a^7$, $a^8$, and $a^9$, transmits the motion to a disk, $a^{10}$, fixed on the same spindle, $a^{12}$, as the pinion $a^9$. The disk $a^{10}$ carries on its outer face four reels, $a^{11}$, containing the wire for wiring the bottle-corks. The spindle $a^{12}$ is mounted in bearings on the pillar-frame G, and forms the guide for the wires. It is for this purpose formed with four tapering holes longitudinally through it and with a rounded outer head, $a^{13}$, as shown in section at Fig. 4. For guiding the wires from the reels $a^{11}$ to the holes through the spindle $a^{12}$, for taking the curl out of the wires, and for exerting a certain amount of tension on them, as opposed to the pull exerted on their other ends when the pliers pull them through the spindle $a^{12}$, I provide the disk $a^{10}$ with three rings, $n$, made of stout wire and held in four uprights, N. The four wires from the reels are threaded in and out between the rings $n$. The cam B operates the shears $b'$ for cutting off a piece of twisted wire, the bowls $b^2$ on the back legs of the shears working on the upper and lower cam-surface of the cam B. The cam C operates to reciprocate the slide $c'$, working in guides $c^2$ and carrying the fulcrum-pivot $c^3$ of the pliers $c^4$. These latter are at their front ends formed suitably for taking hold of or gripping the twisted end of the wires, to carry them along across the top of the bottle as required, while the back ends of the pliers $c^4$ are connected to the knuckle-joint levers $d'$. The slide $c'$ is jointed to the lever $c^5$, which is fixed on the weight-shaft $c^6$, that works in the boss $c^7$, fixed on the pillar-frame G, and enters the latter, where it is provided with a weighted lever, $c^8$, which carries a bowl, $c^9$, working on the cam C. The knuckle-joint levers $d'$ are operated from the cam D, and are for this purpose jointed to a rod, $d^2$, working in guides $d^3$ on a bracket, $d^4$, which is fixed on the pillar-frame G. The rod $d^2$ is connected to a lever, $d^5$, fixed on a weight-shaft, $d^6$, working in the boss of a bracket, $d^7$, fixed to the pillar G, on the other end of the shaft $d^6$, enters the pillar G, and is provided with a bowl, $d^8$, working on the cam D. The cam E has a cam-surface which operates the concave block $e'$, serving as a rest for the bottle to stand on while being wired. The rest $e'$ is carried by a helical spring, $e^2$, which is placed on the bracket $e^3$, working in guides $e^4$ on the pillar G. The spring serves to accommodate bottles of different length. The rest $e'$ is hollowed out, sloping on one side, as shown in dotted lines at Fig. 1. It is fixed on a stem, $e^5$, which is guided in a boss on the bracket $e^3$. This latter is provided with a bowl, $e^6$, which operates on the lower surface of the cam-groove E. $e^7$ is a guard against which the side of the bottle rests. $e^8$ is a crutch adjustably fixed on a weighted lever, which serves to push the bottle off its rest $e'$ when wired. The lever $e^9$ turns on a pin, $e^{10}$, which is on the bracket $e^3$ and has a nose, $e^{11}$. When the bracket $e^3$ is depressed, the nose $e^{11}$ comes against the tappet $e^{12}$ on the pillar-frame G, and is thereby tilted and its upper end pushed against the lower part of the bottle, thus discharging it down the chute L. This latter is by a pin, $l'$, jointed to the bracket $l^2$, which can be adjusted in position on the pillar G. M is a stop against which the bottle is raised, and which can be adjusted by a screw, $m'$, and hand-wheel $m^2$.

Figure 1:
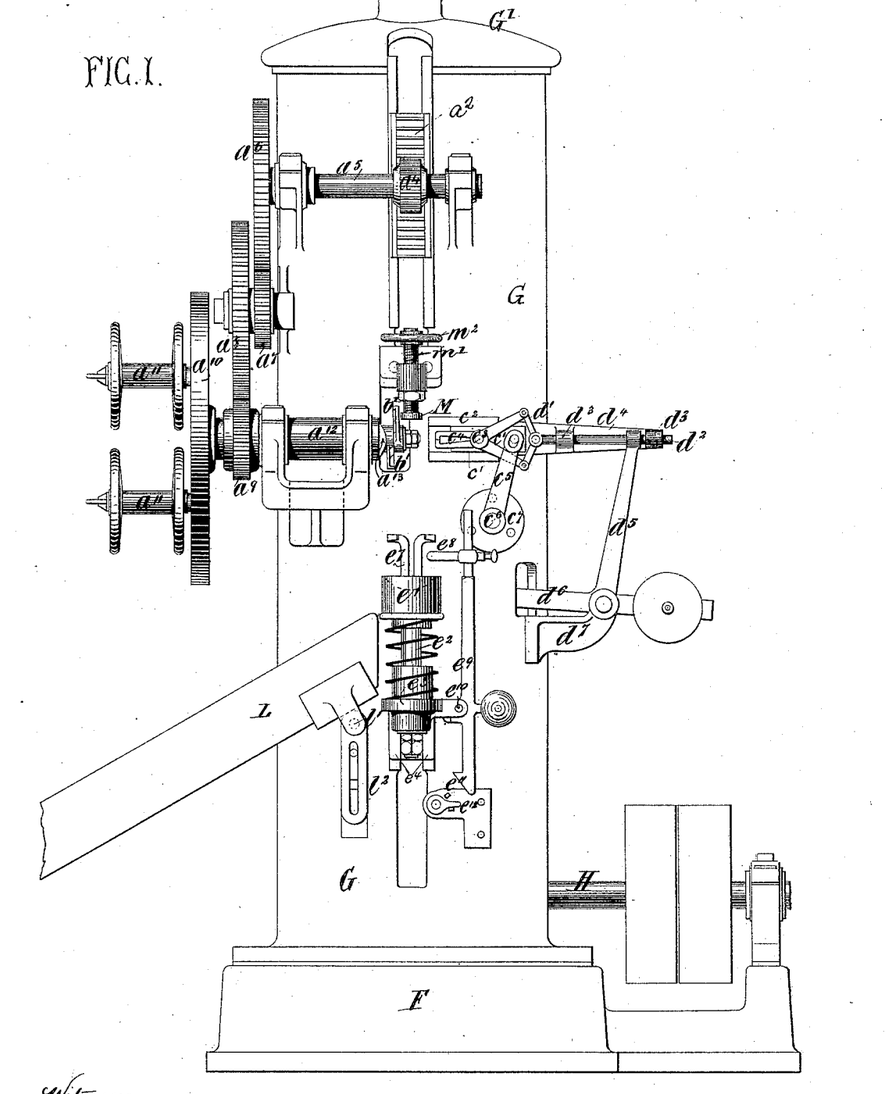
Figure 1 is a front elevation.
Figure 2:
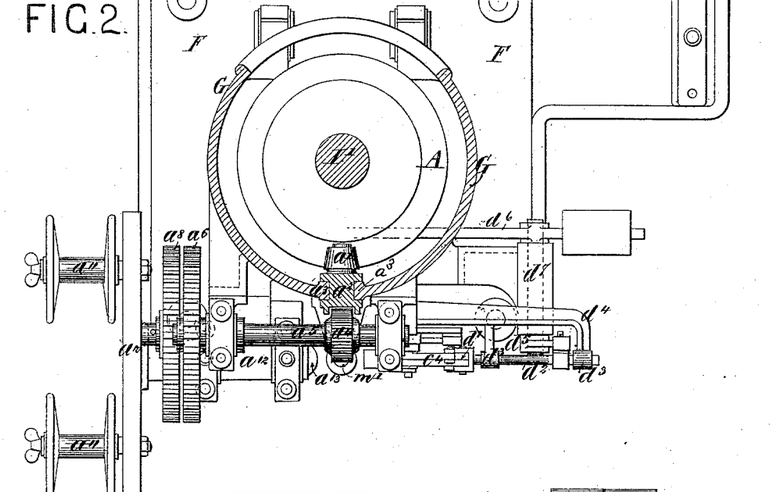
Fig. 2, a plan section on line A A of Fig. 3.
Figure 3:
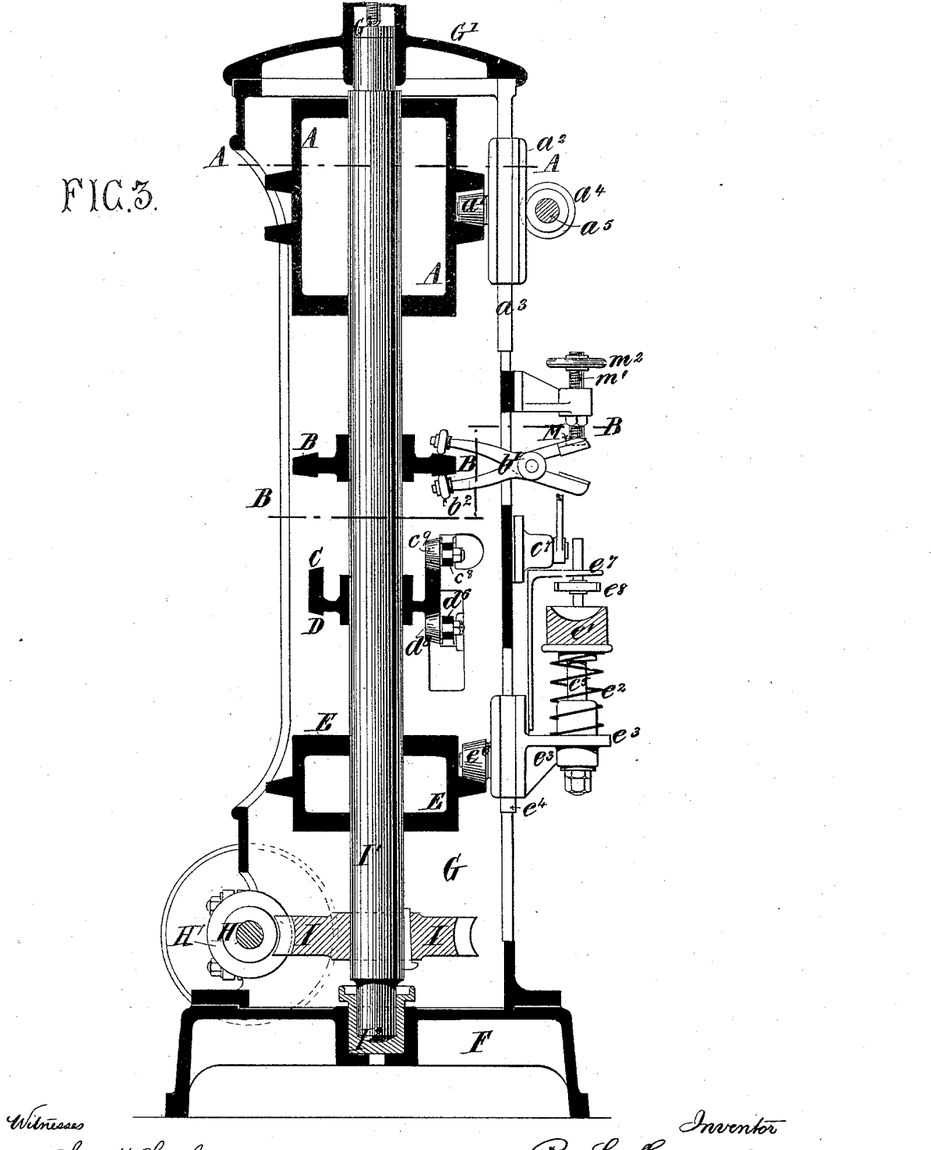
Fig. 3, a vertical transverse section.

The mode of operation of the machine is as follows: The parts are at first in the position shown at Fig. 1, with a short twisted end of the four wires protruding beyond the outer rounded head, $a^{13}$, of the guiding and hoisting spindle $a^{12}$. The pliers $c^4$ are by the cam C advanced toward the head $a^{13}$, and then by the cam D caused to close upon and grip the twisted wire end. The cam C then returns them to their original position, dragging the four wires along with them, pulling them off the four reels $a^{11}$, and through the wire-straightening appliance N $n$. A corked bottle is now placed on the rest $e'$. The cam E raises the bracket $e^3$ with rest $e'$ and the bottle thereon hard up against the stop M, whereby a further length of the two middle wires, passing across the top of the cork, is pulled out of the guide-spindle $a^{12}$ through the wire-straightening appliance N $n$ and off the two corresponding wire-reels $a^{11}$. The cam C now causes the pliers $c^4$ to open, thus releasing the twisted forward end of the wires. While the bottle is still held firmly against the top M, and the right side of the bottle, having thus all four wires twisted and in the right place below the swell of the neck of the bottle, the cam A causes the wires to be twisted (but in the opposite direction) at the other or left side of the bottle neck. The cam B then causes the shears $b$ to cut through the last twisted part of the wires, thus finishing the wiring operation. The cam E then lowers the bracket $e^4$ with the bottle thereon, and as the nose $e^{11}$ comes in contact with the tappet $e^{12}$ the crutch $e^8$ is caused to kick the bottle off its rest and discharge it down the chute L.

Fig. 7 shows the neck of a bottle wired by the employment of my machine.

Figure 8:
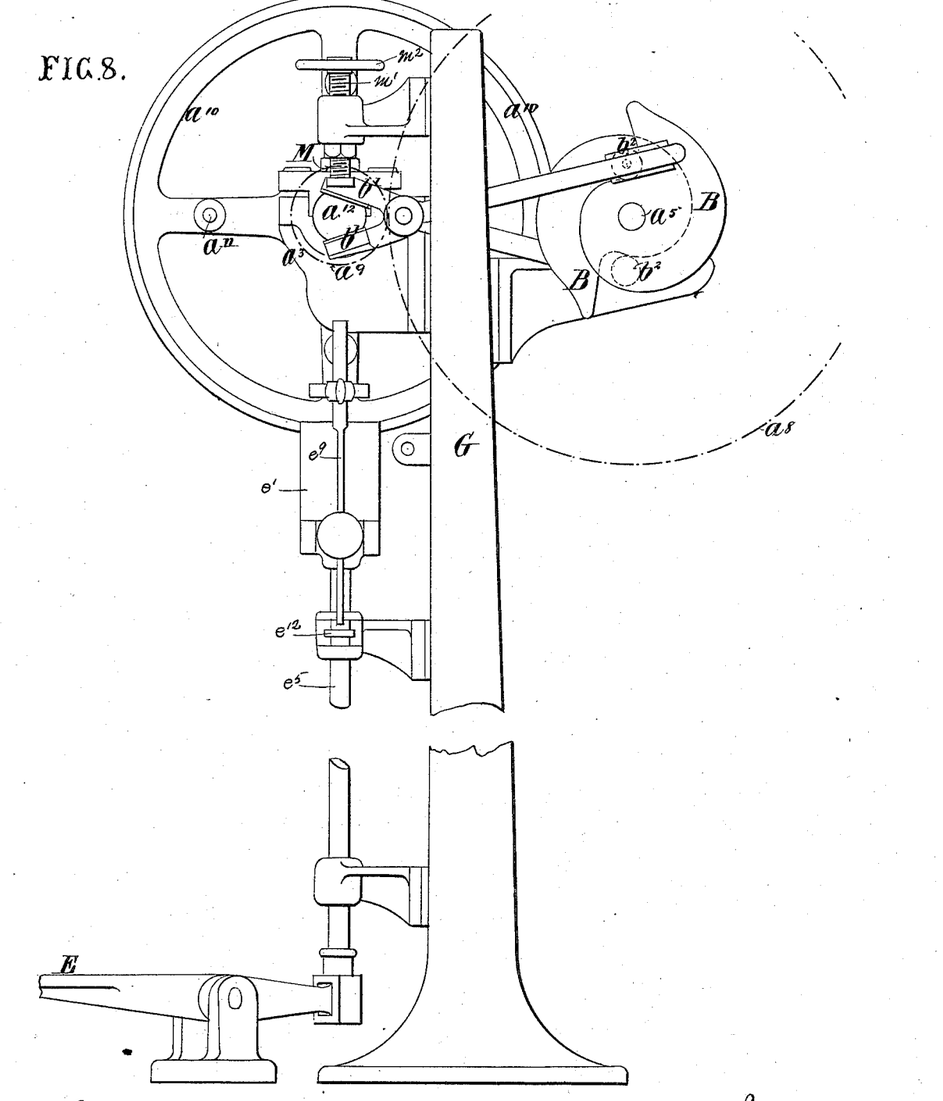
Fig. 8 is a side elevation.
Figure 9:
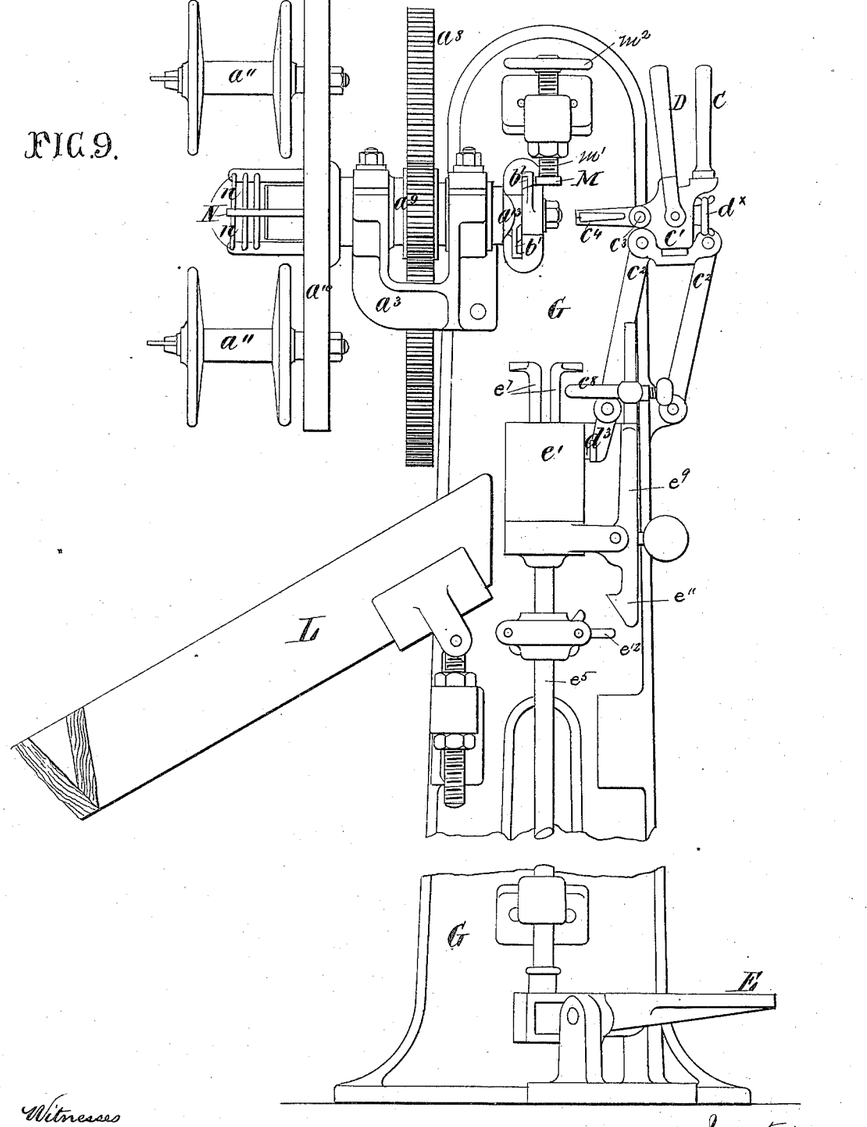
Fig. 9 is a front elevation.
Figure 10:
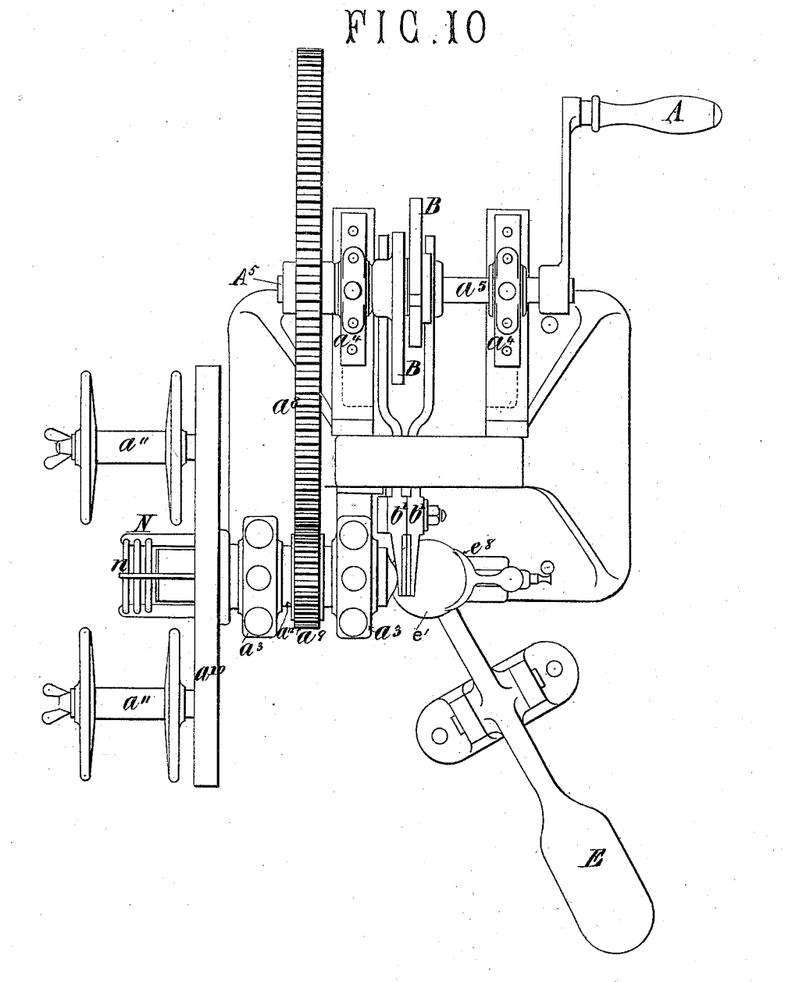
Fig. 10 is a plan, of a wiring-machine adapted to be worked by hand or foot.

Fig. 8 is a side elevation, Fig. 9 a front elevation, and Fig. 10 a plan, of a wiring-machine worked by the hand and by the foot. Fig. 11 is a part vertical section, and Fig. 12 plan section, of detail views of the nippers for conveying the wire across the top of the bottle. The operative elements of the machine are substantially the same, and the sequel of operations precisely the same as in the first-described machine. G is the frame of the machine. $a^{12}$ is the guide-spindle for the wires, and $a^{10}$ the disk fixed thereon and carrying the four wire-reels $a^{11}$ and the wire guide and straightener N $n$. On the guide-spindle $a^{12}$ is fixed the tooth-pinion $a^9$, which gears with the wheel $a^8$ on a spindle, $a^5$, working in bearings on the bracket $a^4$, which is fixed on the frame G. Motion is imparted to the spindle $a^5$ by manual power exerted on the handle A. On the spindle $a^5$ are also fixed two cams, B, which operate the shears $b'$, for cutting off a piece of twisted wire, the bowls $b^2$ on the back ends of the shears following the cam-path. The pliers $c^4$, which are shown in detail at Figs. 11 and 12, turn on a common fulcrum, $c^3$, and are held in a carriage or part, $c'$, which is provided with a handle, C. The pliers $c^4$ are opened by a rubber loop-spring, $d^×$, and can be made to close by pulling back a handle, D, having a lower forked fulcrum end, and the fulcrum-pin of which is formed or provided with a cam, $d^8$, working between the back shanks of the pliers $c^4$. $c^2$ $c^2$ are parallel rods for guiding the carriage $c'$ in a horizontal direction. One of them is at the lower end formed with a prolongation, which in the back-stroke comes against the stop $d^3$. The stop M, the bottle rest $e'$, and parts connected therewith, and the crutch $e^8$, for kicking the wired bottle down the chute L, are all constructed and arranged as in the first described machine, except in so far as that the bottle-rest $e'$ is moved up and down by means of a treadle, E, instead of by a cam.

Figure 13:
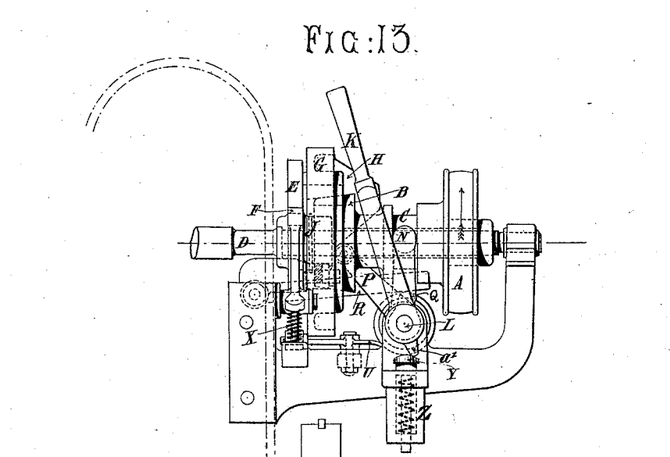
Fig. 13 is a partial side view, Fig. 14 a partial end view, and Fig. 15 a partial plan view, of a power appliance adapted for use with my wiring-machine.
Figure 15:
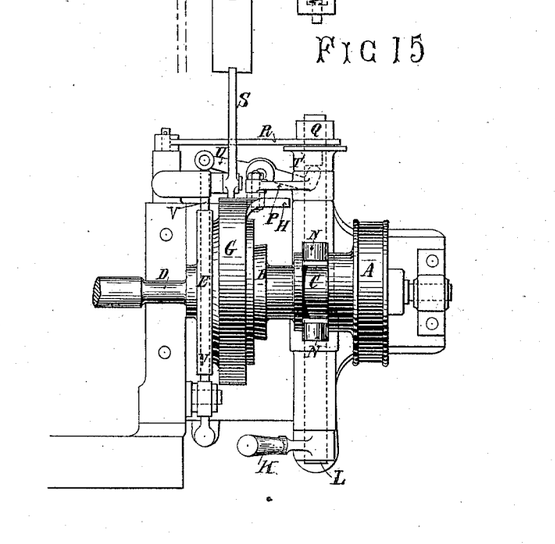

Fig. 13 is a part side view, Fig. 14 a part end view, and Fig. 15 a part plan view, of an arrangement for using power in connection with the "wiring-machine" just above described, instead of a crank worked by hand. A is a belt-pulley. B is a friction-cone. C is a clutch. These are all cast in one piece and run loose upon the shaft D, which is the same as the spindle $a^5$, Figs. 8, 9, and 10. The pulley and cone are driven continuously by the belt in the direction shown by the arrows. E is a plate, which has a notch cut in its edge fitting the catch F. Upon the side of this plate and in one with it the seating is formed for the friction-cone B. G is a brake-rim, on the side of which a cam, H, projects. The catch-plate E, carrying the brake-rim G, is secured to the driving-shaft of the machine D by a pin, J.

The action is as follows: The handle K, secured to the shaft L, is pushed into the position shown in Fig. 13, and by means of a claw-clutch, M, also secured to the shaft, the cone B is forced into its working position by the lever N, thereby causing the shaft D to rotate, driving the machine. After, say, three fourths of a revolution has been completed, the cam H engages with the lever P, and withdraws the friction-cone. At the same time the cam Q on the shaft L lowers the lever R and applies the brake S, also the cam T releases the lever U, which is connected by a rod, V, to the catch F, which catch, by the action of a spring, $x$, will fall into the notch in the plate E when the revolution is completed.

In starting the machine the actions are reversed, the brake S is taken off, and the catch F withdrawn by the same motion employed to force in the friction-cone.

It will be noticed that the movement of the lever P is nearly two inches, while lever N moves only about one-fourth of an inch. This difference is allowed for by a slack action in the claws of the clutch M, which engage with those on the lever N, the lever N being loose upon the shaft and driven by M, which is fixed upon the same. The lever K is kept in position by a stop, Y, which is pressed by a spring, Z, against a projection, A', forged on the lever K.

In the afore described machines the wire produced is of such a form that pinchers will be generally required for unwinding when desired to open a bottle.

I shall proceed to describe a wiring-machine which produces work that can be undone without the aid of tools. Fig. 16 is a part end view of the upper part of such a machine, (the lower part being the same as that of Figs. 8 to 12;) Fig. 17, a side view, partly in section; and Fig. 18 a plan section.

The machine, as shown, is in the position it would assume when the twisting is complete, the shears having just cut the wires, and the prongs, which have formed the loop, only needing to be withdrawn to release the bottle. The twisting-gear consists of a ring, D, which works in an outer trunnion-bearing, L, and has a pinion, D', attached thereto. A slide, E, fits in the middle of the ring D, and is provided with three prongs, F.

When commencing to wire a bottle, the lever A is raised, and with it the slide B, which works in guides B' and carries a tongue, C, that catches in a groove turned in the edge of the twisting-ring D. This catch withdraws the slide E, which is fitted in the twisting-ring D, and lifts the prongs F clear, so that the pinchers G may pass through the aperture H in the twisting-ring D and pinion D', attached thereto, thence past the shears J, to grip the twisted wires projecting from the guide K. The wires are then pulled across the top of the bottle. The bottle is then raised to its wiring position, the pinchers release the wires, the slide E, with its three prongs, F, is then lowered, the prongs passing between the four wires, as shown. The ring D, with its slide E and prongs F, is then caused to revolve (say, two revolutions) by the toothed wheel $D^2$, secured on a driving-shaft, $D^3$, at its side. This twists the wires, and forms a loop, M. (See Fig. 19.) The twisted ends of the wires are then severed by the shears J, the prongs are withdrawn, and the operation is completed.

The finished loop will appear in plan, as shown in Fig. 19, from which it will be seen that a loop, M', is formed on the outside of the bottle-neck, for taking hold of by the fingers, thus facilitating the untwisting of the wiring on the neck.

Figure 20:
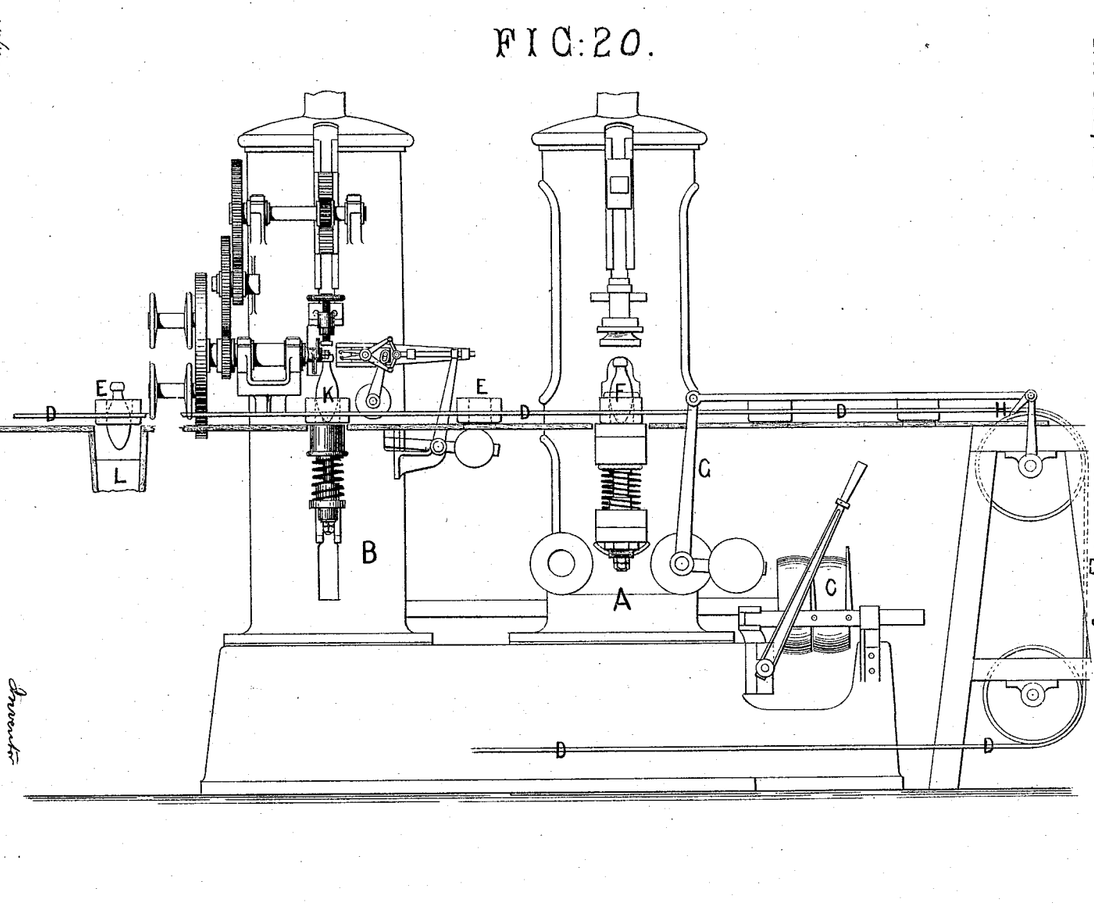
Fig. 20 shows the combined filling, corking, and wiring machine.

Fig. 20 is a side elevation of a combined filling, corking, and wiring machine. It consists, essentially, of a combination of a Macdonell's patent filling and corking machine, mounted on a pillar-frame, A, and of a wiring-machine mounted on a pillar-frame, B, both machines being driven from one shaft by the strap-pulleys C, and of a traveling endless band, D, fitted with blocks E, placed equidistant along its length, the said blocks being constructed to carry the bottles that are to be filled, corked, and wired.

The action of the machine is as follows: The empty bottle is placed in the position as shown, on the filling and corking machine at F, and after the bottle has been filled and corked, the lever G, which is actuated by a cam on the vertical or center spindle of the machine, actuates a ratchet, H, and advances the endless band D with the bottle and brings it into the position K, ready for wiring. At the same time that the bottle is being wired at K, a second bottle is being filled at F, and on the completion of the first bottle being wired and the second bottle filled, the lever G, with its ratchet attachment H, again advances the endless band and brings the first bottle over the discharge-chute L, and the second bottle to the position K, ready for wiring.

From the foregoing and from the knowledge possessed by one skilled in the art, it will also be understood that the hand-power wiring-machine may be used in conjunction with a hand-power bottling-machine or with a steam-power bottling-machine.

The wiring for corks or stoppers of bottles composed of four pieces of wire with twisted ends, and with or without an additional loop formed with said wiring, are not claimed herein, as they form the subject of a separate application for Letters Patent, filed March 30, 1885, Serial No. 160,565.

I claim as my invention—

1. The combination, in a machine for wiring corked or stoppered bottles, of reels for the wire, guides for the wires to pass through, a twister, a reciprocating bottle-stand, reciprocating pinchers for conveying the wires from the guides over the cork and alongside the bottle-neck, and shears for cutting the twisted wires, and means, substantially as specified, for operating the various parts, substantially as set forth.

2. In a bottle-wiring machine, pinchers for grasping the wires and for conveying two of the wires across the top of the cork and one at each side of the bottle-neck, and the guide K, in combination with the ring D, the trunnion L, in which the ring D is revolved, the slide E and prongs F, passing into the ring D, means for periodically rotating the ring D and twisting the wires and forming the loop M', and means, substantially as specified, for raising and lowering the slide E, substantially as described.

3. In a wiring-machine, an elastically-mounted rest for receiving the corked bottle to be wired, in combination with an adjustable stop, and means for periodically raising the said rest with the bottle on against the said stop, and for lowering it and delivering the bottle when wired, substantially as set forth.

ROBERT LUKE HOWARD.

Witnesses:
 E. JENSEN,
 FRED. PRINCE,
*Both of 33 Chancery Lane, London, W. C.*